(12) United States Patent
Palanichamy et al.

(10) Patent No.: US 9,069,973 B2
(45) Date of Patent: Jun. 30, 2015

(54) PASSWORD PROTECT FEATURE FOR APPLICATION IN MOBILE DEVICE DURING A REMOTE SESSION

(71) Applicant: AetherPal Inc., South Plainfield, NJ (US)

(72) Inventors: Ranjithkumar Palanichamy, Piscataway, NJ (US); Deepak Gonsalves, Bridgewater, NJ (US)

(73) Assignee: AetherPal Inc., South Plainfield, NJ (US)

( * ) Notice: Subject to any disclaimer, the term of this patent is extended or adjusted under 35 U.S.C. 154(b) by 126 days.

(21) Appl. No.: 13/842,691

(22) Filed: Mar. 15, 2013

(65) Prior Publication Data

US 2013/0263288 A1    Oct. 3, 2013

Related U.S. Application Data

(60) Provisional application No. 61/617,860, filed on Mar. 30, 2012.

(51) Int. Cl.
| | |
|---|---|
| *G06F 21/00* | (2013.01) |
| *G06F 21/60* | (2013.01) |
| *G06F 3/14* | (2006.01) |
| *G06F 21/31* | (2013.01) |
| *G06F 21/62* | (2013.01) |
| *H04L 12/24* | (2006.01) |

(52) U.S. Cl.
CPC .............. *G06F 21/60* (2013.01); *G06F 3/1454* (2013.01); *G06F 21/31* (2013.01); *G06F 21/6209* (2013.01); *H04L 41/28* (2013.01); *G06F 2221/032* (2013.01)

(58) Field of Classification Search
CPC ......... G06F 21/60; G06F 21/53; G06F 21/00; G06F 21/629
USPC ............ 726/30, 4, 12; 715/760; 713/201, 202
See application file for complete search history.

(56) References Cited

U.S. PATENT DOCUMENTS 5,995,829 A   11/1999   Broderick
5,999,521 A   12/1999   Thompson
(Continued)

FOREIGN PATENT DOCUMENTS

EP         1429569       12/2003
WO     WO2005001665      1/2005

OTHER PUBLICATIONS

Anonymous, "SyncML notification initiated session", Internet Citation, XP002462105, URL:http://www.openmobilealliance.org/tech/affiliates/syncml/syncml_dm_notification_v11_20020215.pdf, (Dec. 12, 2007).

(Continued)

*Primary Examiner* — Syed Zaidi
(74) *Attorney, Agent, or Firm* — Volpe and Koenig, P.C.

(57) ABSTRACT

Disclosed is a method of password protection applied to applications on mobile devices during a remote control session. When a mobile device is connected to a remote support technician providing said remote support technician access to the mobile device, when a user highlights a password field the password is contextually hidden on remote support technician's console. A toast message is displayed on the remote access console and the user's mobile device and the remote support technician is denied the ability to edit the user's password field.

24 Claims, 11 Drawing Sheets (56) References Cited

U.S. PATENT DOCUMENTS

| | | | |
|---|---|---|---|
| 6,047,071 A | 4/2000 | Shah | |
| 6,144,849 A | 11/2000 | Nodoushani et al. | |
| 6,148,197 A | 11/2000 | Bridges et al. | |
| 6,201,964 B1 | 3/2001 | Tung et al. | |
| 6,378,088 B1 | 4/2002 | Mongan | |
| 6,516,188 B1 | 2/2003 | New et al. | |
| 6,564,055 B1 | 5/2003 | Hronek | |
| 6,584,454 B1* | 6/2003 | Hummel et al. | 705/59 |
| 6,615,038 B1 | 9/2003 | Moles et al. | |
| 6,625,451 B1 | 9/2003 | LaMedica, Jr. et al. | |
| 6,684,359 B2 | 1/2004 | Noy | |
| 6,907,546 B1 | 6/2005 | Haswell et al. | |
| 6,925,405 B2 | 8/2005 | Adir et al. | |
| 6,959,433 B1 | 10/2005 | Morales, Jr. et al. | |
| 6,970,719 B1 | 11/2005 | McConnell et al. | |
| 7,032,212 B2 | 4/2006 | Amir et al. | |
| 7,194,264 B2 | 3/2007 | Li et al. | |
| 7,286,802 B2 | 10/2007 | Beyme et al. | |
| 7,805,719 B2 | 9/2010 | O'Neill | |
| 2002/0066039 A1* | 5/2002 | Dent | 713/202 |
| 2003/0065738 A1 | 4/2003 | Yang et al. | |
| 2003/0066065 A1 | 4/2003 | Larkin | |
| 2003/0069994 A1* | 4/2003 | Herceg et al. | 709/246 |
| 2003/0101246 A1 | 5/2003 | Lahti | |
| 2003/0156549 A1 | 8/2003 | Binder et al. | |
| 2003/0204726 A1 | 10/2003 | Kefford et al. | |
| 2004/0098715 A1 | 5/2004 | Aghera et al. | |
| 2004/0268148 A1* | 12/2004 | Karjala et al. | 713/201 |
| 2005/0193098 A1 | 9/2005 | Khandpur et al. | |
| 2005/0227688 A1 | 10/2005 | Li et al. | |
| 2006/0015404 A1 | 1/2006 | Tran | |
| 2006/0015626 A1 | 1/2006 | Hallamaa et al. | |
| 2006/0075284 A1 | 4/2006 | Skan | |
| 2006/0130046 A1 | 6/2006 | O'Neill | |
| 2006/0136922 A1 | 6/2006 | Zimberg et al. | |
| 2006/0248522 A1 | 11/2006 | Lakshminarayanan et al. | |
| 2007/0005647 A1 | 1/2007 | Cugi et al. | |
| 2007/0106564 A1 | 5/2007 | Matotek et al. | |
| 2007/0299940 A1 | 12/2007 | Gbadegesin et al. | |
| 2008/0098380 A1 | 4/2008 | Klusmeyer | |
| 2008/0120557 A1* | 5/2008 | Offenhartz et al. | 715/760 |
| 2008/0172736 A1 | 7/2008 | Barr et al. | |
| 2008/0189781 A1* | 8/2008 | Pathak et al. | 726/12 |
| 2008/0209193 A1 | 8/2008 | Zhang et al. | |
| 2009/0164602 A1 | 6/2009 | Kies et al. | |
| 2009/0177882 A1 | 7/2009 | Saran et al. | |
| 2009/0221307 A1 | 9/2009 | Wolak et al. | |
| 2009/0228966 A1 | 9/2009 | Parfene et al. | |
| 2010/0070649 A1 | 3/2010 | Ng | |
| 2010/0151823 A1 | 6/2010 | Dagorn et al. | |
| 2010/0217780 A1 | 8/2010 | Erola et al. | |
| 2011/0277019 A1* | 11/2011 | Pritchard, Jr. | 726/4 |
| 2013/0054969 A1 | 2/2013 | Charles et al. | |

OTHER PUBLICATIONS

Kovacs, E. et al, "Integrating mobile agents into the mobile middleware", Internet article: http://download.springer.com/static/pdf/630/art%253A10.1007%252FBF01324936.pdf?auth66=1353975026_642152af85f26d0903f4dc786bdf1416&ext=.pdf>, p. 68-74, (Retrieved from Internet Nov. 26, 2012).

Caporuscio, M. et al, "Design and evaluation of a support service for mobile, wireless publish subscribe applications", 2003 IEEE, Internet article: http:ieeexplore.ieee.org/stamp/stamp.jsp?tp=&arnumber=1265521, 29:12, p. 1059-1071, (Retrieved from Internet Nov 26, 2012).

* cited by examiner

User           Remote Session

PASSWORD PROTECT FEATURE FOR APPLICATION IN MOBILE DEVICE DURING A REMOTE SESSION

PRIORITY CLAIM

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/617,860, entitled "PASSWORD PROTECT FEATURE FOR APPLICATION IN MOBILE DEVICE DURING A REMOTE SESSION", filed on Mar. 30, 2012. The contents of which the above referenced application is incorporated herein by reference in its entirety.

FIELD OF INVENTION

The present invention relates to mobile wireless communication devices, systems, networks, and methods of operation and in particular to a password protect feature for application in mobile device during a remote session.

BACKGROUND OF INVENTION

Traditionally the mobile user customer care is handled manually by the customer care technician requesting the end user to take specific actions on the device and user informing the technician with the results observed on the device. In some instances the end user informs the technician the actions being performed on the device and the technician assessing the next steps based on the results observed according to predefined scripts that are defined in the knowledgebase.

When a customer care technician is able to connect to a user mobile device and control the device to troubleshoot a problem it is desired that sensitive password text is contextually hidden from the remote support technician.

SUMMARY OF INVENTION

This invention describes the feature of Password Protection that can be applied to applications on mobile devices during a remote control session.

An objective of the invention is to provide a user with complete privacy of his/her application passwords during a remote control session.

Another objective of the invention is to provide a user with complete privacy of his/her passwords to e-mails, social network, banking applications and the like applications which involves the user to enter the password or PIN.

Still another objective of the invention is to contextually hide passwords from a customer care technician when being edited by the user.

Still another objective of the invention is to allow a technician to navigate through a mobile device without any impact to user authentication data.

Yet still another objective of the invention is to allow carriers and other tech support organizations to be able to support remote control to a mobile device without worrying about legal issues of privacy infringement.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
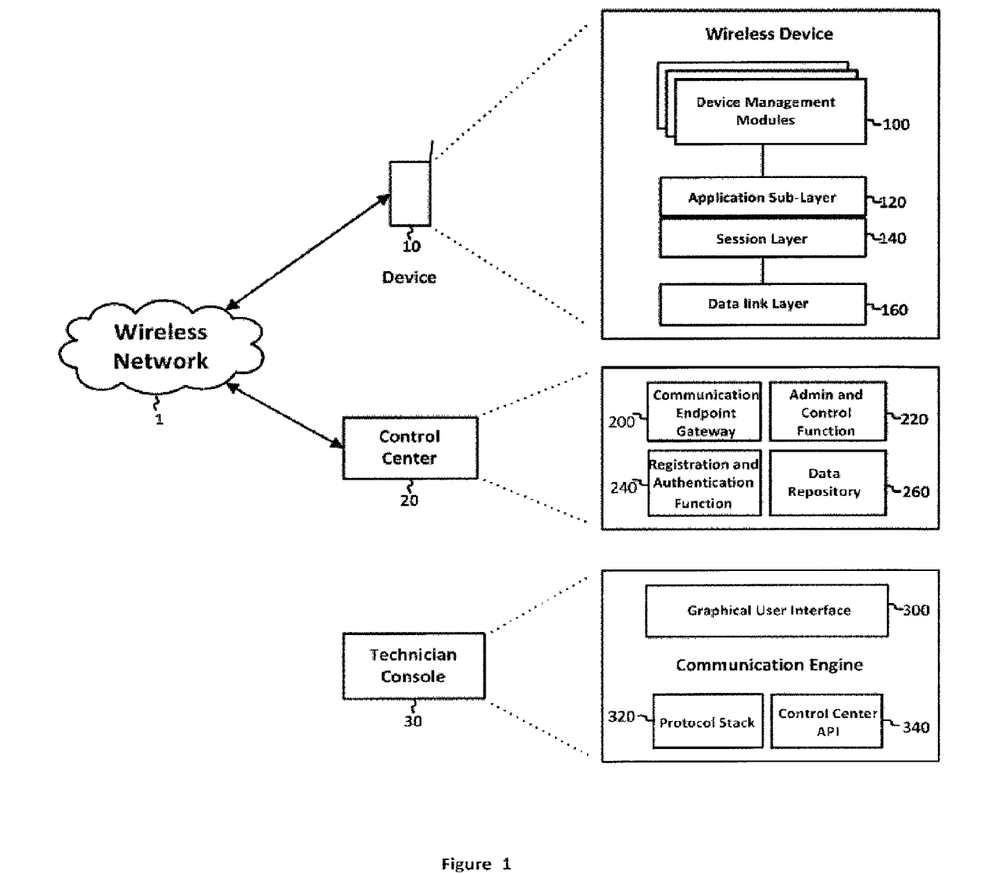
FIG. 1 illustrates the overall architecture of the Virtual Mobile Management (VMM) system.

Referring to FIG. 1, set forth is the overall architecture of the Virtual Mobile Management (VMM) system. For the purpose of readability, Blocks number starting with 1xx relates to Device [10] and it components; 2xx under refer to Control Center [20] and its components; 3xx under relate to Technician Console [30] and its components.

The Virtual Mobile Management Remote Control (VMM-RC) is a powerful tool designed to be used by the customer care representatives to remotely view and control the mobile devices. In a preferred embodiment, the key components of the VMM-RC system include: Technician Console [30] where care agents interact with the remote devices [10] through Control Center [20] services that mediate communication between the Technician Console [30] and the remote devices [10].

The Control Center [20] comprises the following elements:
Communication Endpoint Gateway or CEG [200]
Admin and Control Function or ACF [220]
Registration and Authentication Function or RAF [240]
Data Repository [260]

The primary responsibility of CEG [200] is to manage and mediate sessions. The server provides communication endpoints between device [10] and Technician Console [30]. This allows for multiple requests to be serviced within one session from multiple instances of [30]. The CEG or [200] provides a consistent manner of device connection and Tool service in a system with heterogeneous devices running different operating systems. The CEG or [200] provides load balancing across multiple Connection Handlers on each Communication End Point Gateway Server in order to minimize single point of failure.

Figure 2:
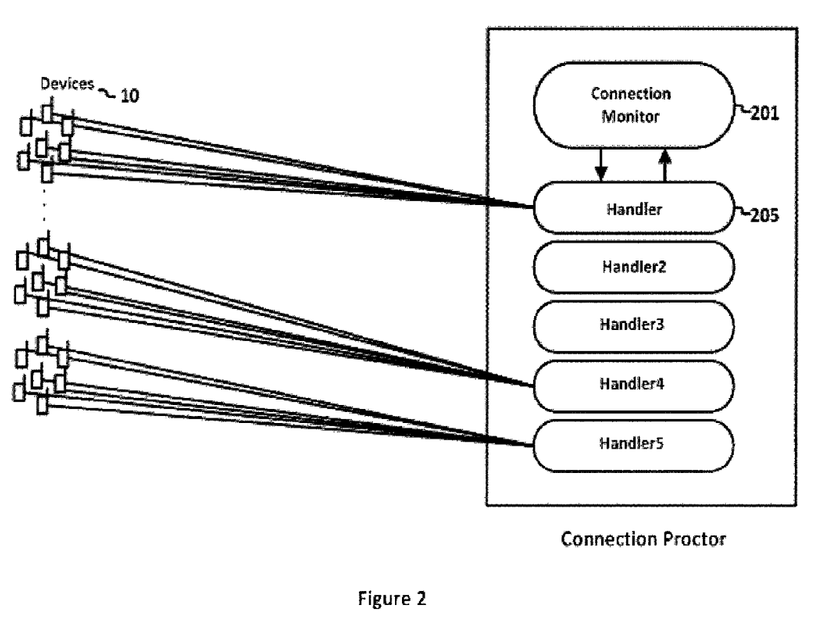
FIG. 2 illustrates the details of Communication Endpoint Gateway.

FIG. 2, shows components of CEG [200] in detail. CEG [200] is comprised of two components; the Connection Monitor and the Connection Handler [205].

The primary function of [201] is: Create and manage multiple instances of [205]; Creates Session ID for new connection requests; Monitors all the scheduled and existing sessions. The primary function of [205] is: authenticate inbound connections; mediate VMM session traffic between device [10] and Technician Console [30].

Figure 3:
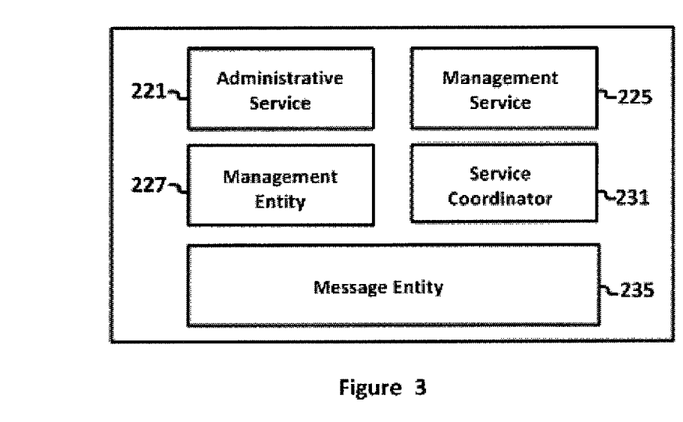
FIG. 3 illustrates the details of Admin and Control Function.

FIG. 3 shows the details of ACF [220] which is responsible in the administration, management and authorization of communication between the Control Center [20] and the devices [10]. It comprises of the following service functions.

The Administrative Service [221] is designed to be a central administrative entity of the entire virtual mobile management system. Through this service, system administrators perform administration, management and instrumentation servers within the system, create and maintain multiple tenants, assign tenant administrator roles, etc.

The Management Service [225] provides the operational endpoint to the system. The primary functions of Management Service are: Load distribution among the CEG, management of device registration; Administration of devices; Administration of users, zones, policies, roles, etc.; and Session Queuing.

The Management Entity [227] component is responsible in providing the Management service [225] with an in-memory data store for key operational data such as ACL, user/group/zone structures, etc.

The Service Coordinator [231] coordinates the communication between various elements within the System. It provides the database interface to the RAF [240] in the Control Center. All services register themselves with this service. This service is responsible for service discovery.

Figure 4:
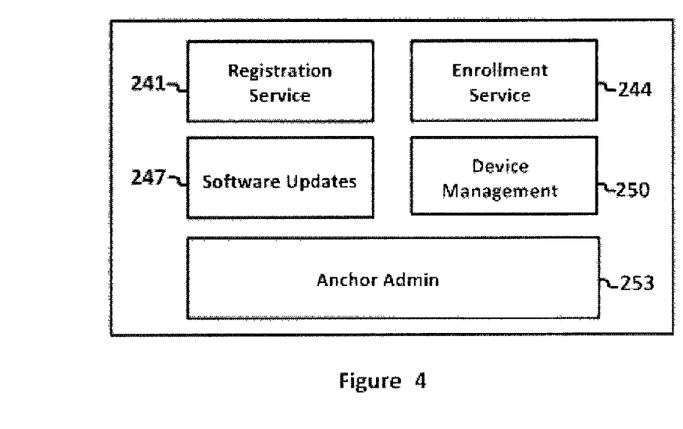
FIG. 4 illustrates the details of Routing and Authentication Function.

FIG. 4 shows the components of RAF [240] in detail; RAF [240] provides a single point of entry for all devices for enrollment and authentication services during VMM-RC session. It comprises of the following components:

Registration Service [241]: During Auto-Enrollment, devices are required to register themselves with this service, prior to enrolling themselves.

Enrollment Service [244]: This service is responsible to enroll registered devices with the system. The Enrollment process is defined in detail in the later sections of the document.

Software Updates [247]: This service manages the various client packages in the system. Devices connect to this service to request for client update. If an update is available, the service will provide the appropriate client download link.

Device Management [250]: This service provides the enrolled devices an interface to update its parameters in the system such as MDN when the device detects a change. AnchorAdmin [253]: This service provides the administration component.

Data Repository [260] is the data warehouse that stores the information about the VMM-RC Mobile devices, server configuration, tasks and status settings. These data bases are pivotal to configure and update managed devices and server components. It is also responsible to maintain the user login information as well as device authentication information.

Figure 5:
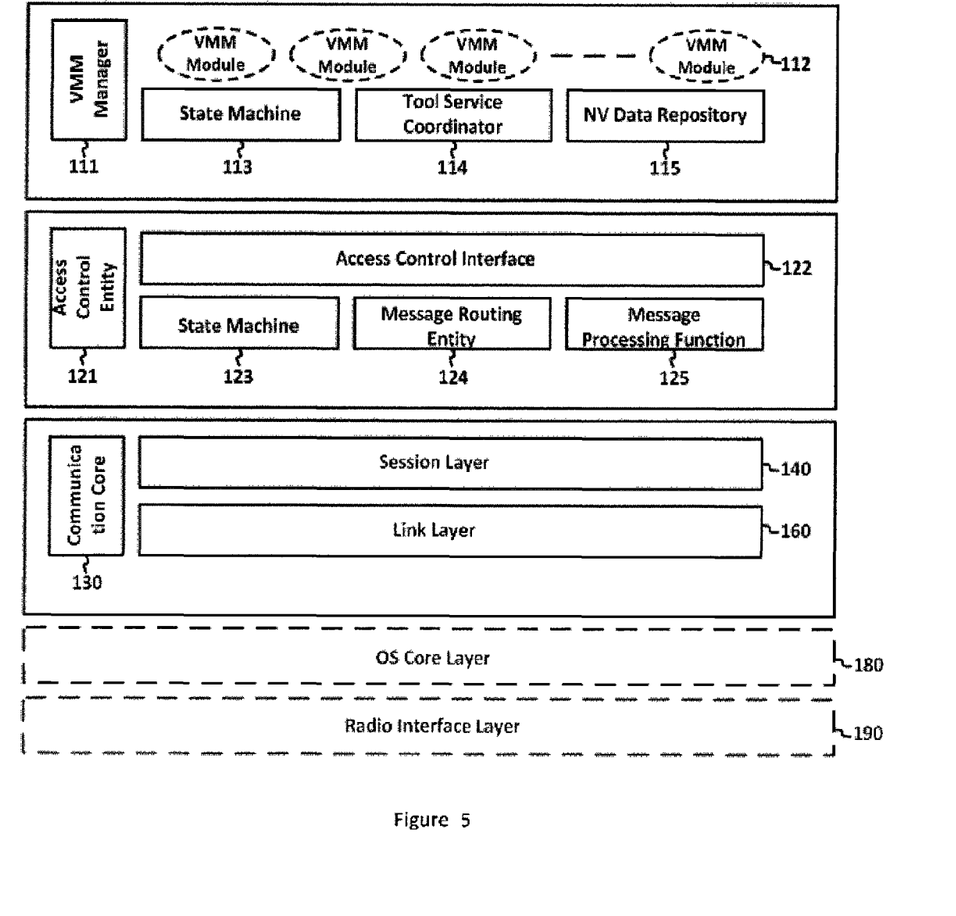
FIG. 5 illustrates the VMM client protocol architecture of Device.

FIG. 5 illustrates the VMM client protocol architecture of Device [10]. The VMM Client architecture comprises of the following protocol layers and function blocks VMM Manager [111] this layer encapsulates functional entities that provide the communication and protocol frameworks necessary to client services. This layer primarily handles bearer plane traffic. The following functional entities are part of [111].

VMM Modules [112] provide a multitude of tool services. Tool Services are grouped together that exhibit common functionality such as Remote Control, File Manager, Device Management, etc.

State Machine [113], each tool service maintains an instance of the state machine. A State Machine defines a set of shared states that the tool service on the device application shares with the server.

Tool Service Coordinator [114] maintains a collection of active tool service instances that are currently being serviced by the VMM application. This entity maintains the lifetime of all Tool Services, and is responsible in creating and destroying Tool Services.

NV Data Repository [115] authentication and authorization specific data that is shared between the VMM application and the server is maintained within the NV data repository. This data repository also serves the purpose of maintaining Tool Service configuration as well as VMM configuration data.

Access Control Entity [121] layer provides a set of functions to the Tool Services to communicate with the Control Center [20]. It provides in the encapsulation of messages before forwarding it to the Communication Core [130]. This layer is responsible to invoke an instance of the Communication Core [130] layer and provides a state machine [123] that defines the state of the VMM application.

Access Control Interface [122] provides a set standard Application Programmer Interface or API to the Tool Services. These APIs provide a consistent communication platform to facilitate both synchronous as well as asynchronous communication.

State Machine [123] identifies the overall state of the VMM application. State transitions within the ACE State Machine triggers events that are handled by the VMM layer. The states are Open and Closed. Traffic flows through the ACI layer only in the State Open.

Message Routing Entity [124] is responsible for routing all signal messages, destined to Tool Services to the respective event handlers.

Message Processing Function [125] is a signal message pre-processor. This entity receives signal messages from the Session Layer destined towards Tool Services. It de-frames these messages prior to forwarding it to the Message Routing Entity to apply routing rules. Messages that are destined for the server from Tool Services are encapsulated here.

Communication Core [130] Layer is responsible to set up and maintain a dedicated communication channel with the Control Center [20]. This layer provides the necessary framework to transport messages between the upper layers and the Control Center [20]. It provides message encapsulation, framing, fragmentation and packet re-construction of Tool Service messages.

Figure 6:
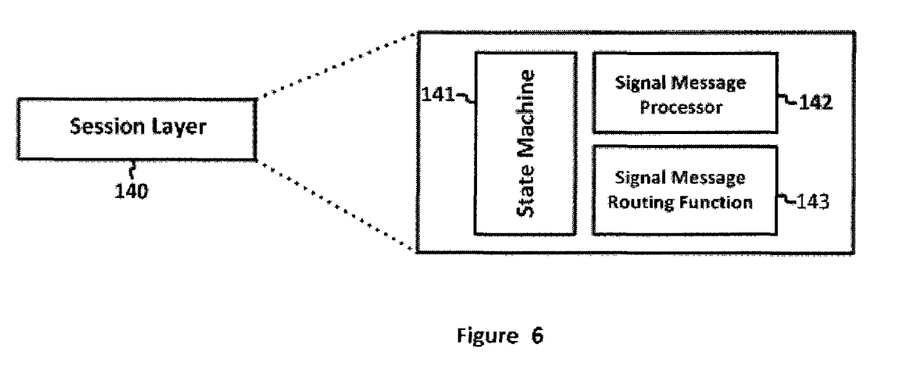
FIG. 6 illustrates the details of VMM Client Session Layer.

The communication core [130] comprises of the following sub-layers. FIG. 6 is a detail of Session Layer [140]. The session layer maintains a set of shared state between the Communication Endpoint Gateway (CEG) [200] and the VMM Application Module [112]. The session layer packets encapsulate signal messages that are transported between the CEG [200] and the VMM Module [112]. Each message within the session layer packet defines the source and destination to which the signal messages are to be delivered. The session layer consists of the following entities:

State Machine [141] maintains a state within a predefined set of shared state between the application and the CEG [200]. State changes within the state machine trigger the execution of state transition procedures within the VMM Application Module [112].

Signal Message Processor [142] is responsible to encapsulate and process signal messages that are transmitted between the CEG [200] and the Application Module [112]. This entity is also responsible in influencing the state transition within the state machine by altering its state. Signal messages destined to VMM modules are forwarded to the Signal Message Routing Function.

Signal Message Routing Function [143] is responsible with the task of forwarding signal messages to the appropriate destination. Signal messages destined to VMM modules are directly forwarded to the VVM Tool Service Coordinator [114]. Signal messages destined to the CEG [200] are forwarded to the link layer [160].

Referring to FIG. 5, another component is the Link Layer [160] which is responsible to establish and maintain a dedicated communication channel between the client and the CEG [200]. The Link Layer encapsulates all messages within its frame prior to forwarding it to the network. Packets that are received by the Link Layer from the network are re-constructed and de-framed prior to forwarding it to the upper layer. This layer checks for message integrity.

Figure 7:
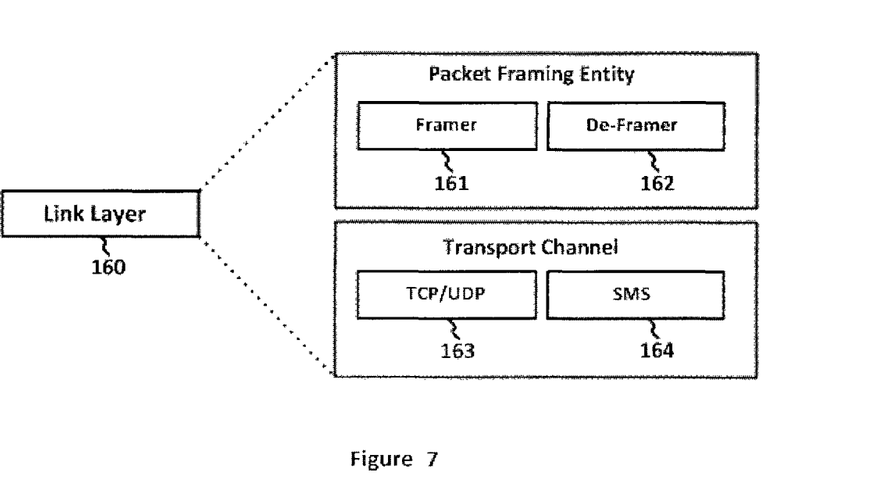
FIG. 7 illustrates the details of the VMM Client Link Layer.

The following components form the Link Layer [160] as in FIG. 7, (Detail of Link Layer in FIG. 5). The Packet Framing Entity [161,162] is responsible to encapsulate messages in Link Layer frames. These frames are then forwarded to the Transport Channel, to be forwarded to the network layer. The packet framing entity comprises of Framer [161] and the De-Framer [162]. When a network packet is received by the Packet Framing Entity, it inspects the packet and verifies the integrity of the packet. Malformed packets are silently discarded.

The Transport Channel [163,164] binds to the appropriate transport layer of the underlying operating system, which is dependent upon the VMM Tool Service. It is responsible to forward messages to the network layer and receives messages from the network layer. It provides notification to the upper layer of the state of the network layer through asynchronous events.

Figure 8:
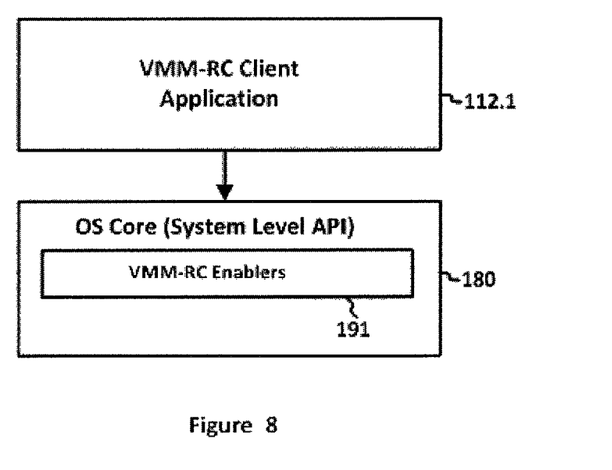
FIG. 8 is a schematic diagram of Virtual Mobile Management-Remote Control VMM-RC on Client side.

FIG. 8 shows is a schematic diagram of Virtual Mobile Management-Remote Control VMM-RC on Client side. The VMM-RC client Application [112.1] on the device provides Core Tool services, to manage the remote control session, collect the desired device diagnostics, provide self-care support for remote session activation and manage security protocol. The VMM-RC client application module [112.1] is one of the many VMM Client Application modules of [112]

The key features that are required by VMM-RC application to manage devices remotely include: Display Capture, this method involves the capturing of the device screen; Key event Injection, this method involves the injection of key events into the device screen; Touch event injection, this method involves the simulation of touch events on the device screen; and Device Information, getting the device information like network, power status, MNC, MCC, IMEI, IMSI, ESN, battery level of the smart phone etc., this is of value to the remote technician.

The VMM-RC Enabler [191] performs the key functions: Intercepts all the SMS; keeps the VMM-RC Application to its current version; if the VMM-RC Application is removed accidentally the VMM-RC Enabler shall connect to the server and download the application and installs the same.

Figure 9:
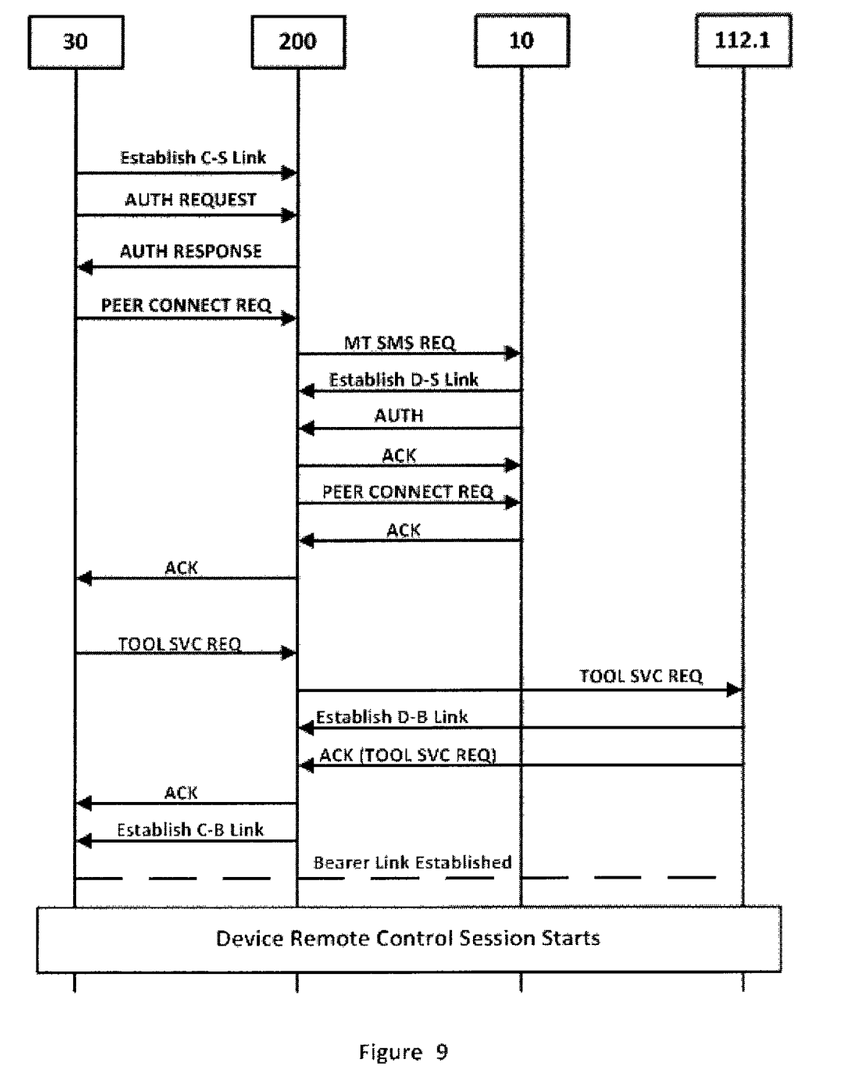
FIG. 9 illustrates the overall process of End-to-End VMM-RC Session establishment.

FIG. 9 illustrates the overall process of End-to-End VMM-RC Session establishment.

(a) CEG[200] receives C-S link connection request from Technician Console [30];

(b) Authentication Request is received by CEG [200] from the Technician Console [30];

(c) Authentication Response is sent by [200] to [30];

(d) PEER_CONNECT_REQ signal is received by [200] from [30];

(e) [200] sends a Mobile Terminated SMS to Device [10];

(f) [200] receives D-S link connection request from Device [10];

(g) Authentication Request is received by [200] from Device [10];

(h) Authentication Response is sent by [200] to Device [10];

(i) PEER_CONNECT_REQ signal sent by [200] to Device [10];

(j) ACK received by [200] from [10];

(k) ACK transmitted by [200] to Technician Console [30];

(l) TOOL_SVC_REQ received by [200] from [30];

(m) TOOL_SVC_REQ relayed by [200] to VMM_RC [112.1];

(n) [200] receives D-B link connection from [112.1];

(o) [200] receives ACK from [112.1] for the TOOL_SVC_REQ for step (m);

(p) ACK relayed by [200] to [30];

(q) [200] receives C-B link connection request from [30].

At this point, the control plane and bearer plane is/are established. VMM-RC bearer data is carried over the bearer channels (D-B and C-B).

Figure 10:
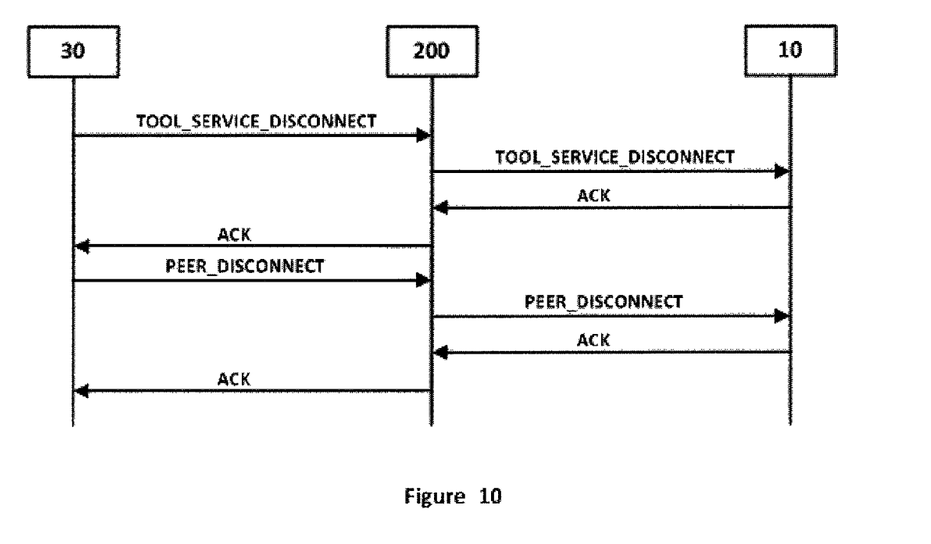
FIG. 10 illustrates the overall process of VMM-RC Session termination.

VMM-Remote Session Termination, referring to FIG. 10, the Technician, operating the Technician Console [30] initiates the VMM-RC service disconnection. The following sequence of events occurs:

(a) TOOL_SVC_DISCONNECT is received from Technician Console [30] by CEG[200];

(b) TOOL_SVC_DISCONNECT is relayed by [200] to Device [10];

(c) ACK is received by [200] from [10];

(d) ACK is relayed by [200] to Technician Console [30];

(e) PEER_DISCONNECT is received from Technician Console [30] by CEG[30];

(f) PEER_DISCONNECT is relayed by [200] to Device [10];

(g) ACK is received by [200] from [10]; and (h) ACK is relayed by [200] to Technician Console [30].

At this time, all channels are disconnected and the VMM-RC session is closed.

The feature of Password Protection can be applied to applications on mobile devices during a remote control session. A remote control session is where a customer care technician is able to connect to a user mobile device and control the device to troubleshoot a problem. The current invention provides the user complete privacy of his/her application passwords during remote control session.

During a remote control session, sensitive password text shall be contextually hidden from the remote support technician. This capability is extended to all password/PIN protected applications. When the user or technician navigates to various applications including but not limited to email, social network, banking applications which involves the users to enter the password or PIN, the password data is contextually hidden from the customer care technician when being edited by the user. The technician shall also be prevented from editing the password data while being edited by the user.

If a soft keyboard is used to enter this data, the keyboard is completely hidden so that any key press by the user while entering the password/PIN is also hidden thereby preventing the customer care technician to guess the password being typed. This feature can be enabled/controlled dynamically as part of the Access control List (ACL) feature either by the user, server or both. ACL is a feature that enables access restrictions to be put for applications on mobile devices during a remote control session.

In operation, a subscriber calls a customer service representative (CSR) and initiates the remote control session. During the remote session, the subscriber navigates to password sensitive applications. For example, e-mail setup, market place login, browser sessions with login pages with password fields, applications installed from market like Skype whose login page is password protected, and so forth. While the subscriber is at the password protected page for a password sensitive application, when the subscriber clicks/highlights the password field, the soft keyboard that appears on the screen shall be hidden from the CSR and will appear greyed out on the remote session console. Even if the orientation of the device is changed, the keyboard shall stay hidden from the CSR view.

Any password input by the subscriber shall appear hidden to the CSR (only asterisk shall be visible). A toast message shall be shown once per remote session the first time a password field is highlighted/selected by the Subscriber. The content of the toast shall be "Your password shall not be visible to the customer service". This message shall be visible to both CSR and Subscriber.

The CSR will not be able to edit the password field by entering digits remotely from remote console.

Once the Subscriber is done typing in the password field, when he/she highlights any other field in the dialog outside the password field the keyboard shall become visible again.

Figure 11:
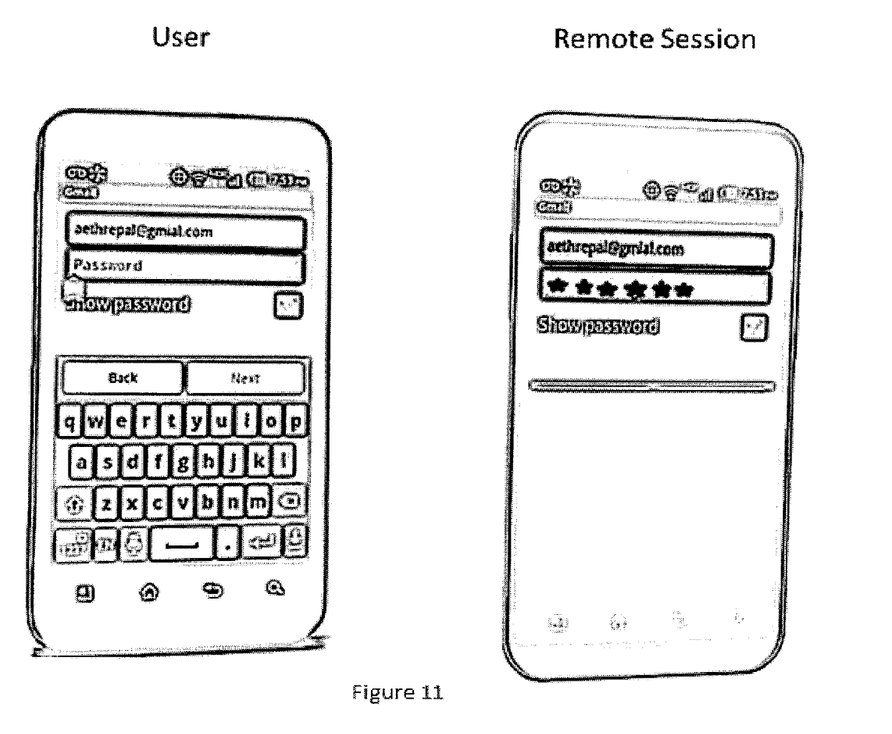
FIG. 11 is a visualization of the current invention.

By way of example, referring to Picture 1 of FIG. 11 is a pictorial of a user display screen. The user has entered their e-mail address and the password is hidden. Picture 2 of FIG. 11 is a pictorial of a remote technician display screen wherein the user's e-mail address is shown and the password is hidden. During a remote control, the technician would be able to navigate thru the device without any impact to user authentication data. This would allow carriers and other tech support organizations to be able to support remote control to a mobile device without worrying about legal issues of privacy infringement.

As the capabilities of the mobile devices continue to expand, they provide the ability to the user to access all their financial transactions, email. Social network data and a multitude of other password protected browser based web transactions from the comfort of their smartphone device. This invention helps to protect the privacy of the end user in this context while a care agent performs the remote session.

Figure 12:
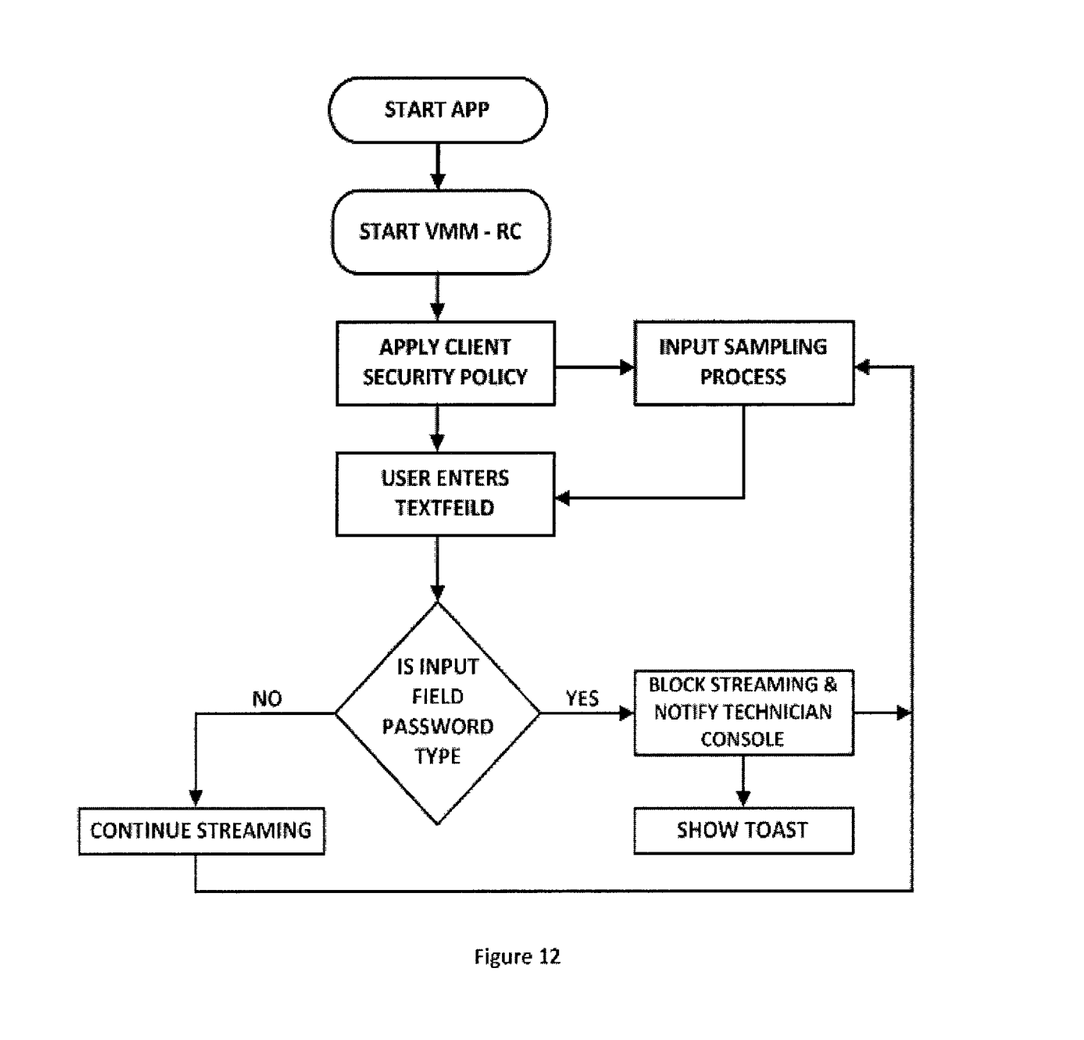
FIG. 12 is a flow diagram of the current invention.

FIG. 12 describes the flow diagram of the current invention.

(a) VMM-RC application [112.] starts on the device as a result VMM-RC remote initiation from Console [30]

(b) Client Security Policy is applied to the VMM-RC application [112.1]

(c) Text Input processor thread is invoked.

(d) During navigation, if the text field in focus is "Password" type, Streaming is paused and a bearer notification is sent to the console (e) A toast message is displayed to the user.

(f) When the Password text field is no longer in focus, streaming is resumed.

Figure 13:
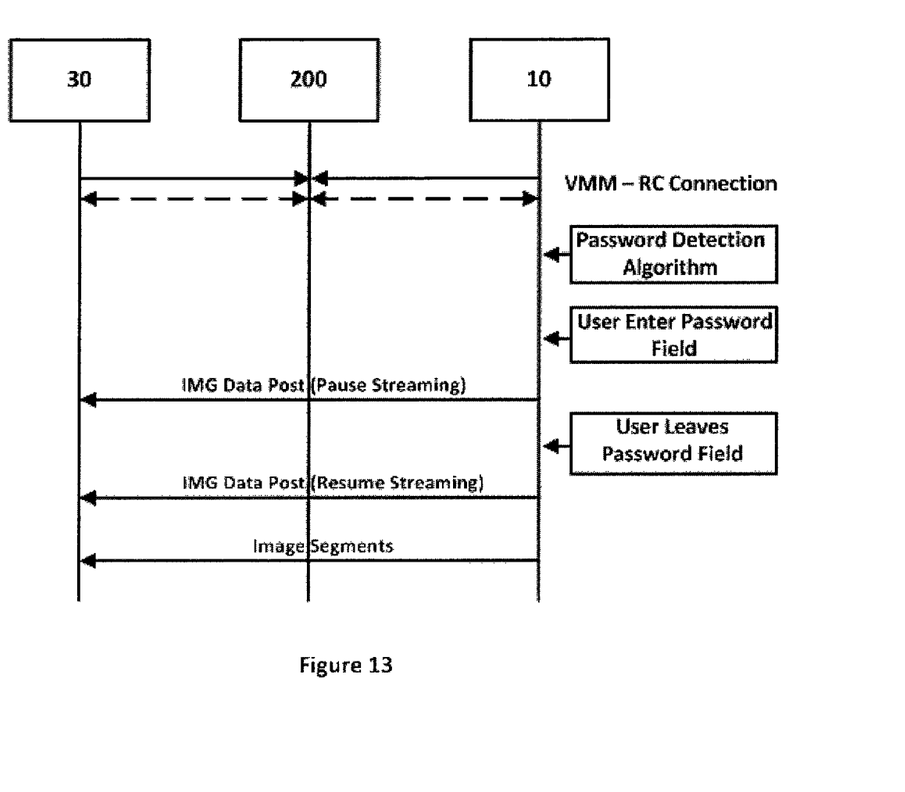
FIG. 13 is a call flow diagram of the current invention.

FIG. 13 describes the call flow diagram of the current invention.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of protecting passwords on a mobile device during a remote management session, the method comprising:
   establishing a remote management session between a console and a mobile device;
   attempting, by the console, to access a protected application on the mobile device;
   pausing streaming of the remote management session between the mobile device and the console on a condition that a user is typing in a field for entry of user authentication data to access the protected application; and
   resuming streaming of the remote management session from the mobile device to the console on a condition that the user is typing outside the field for entry of the user authentication data.

2. The method according to claim 1, wherein the user authentication data is a password.

3. The method according to claim 1, further comprising:
   displaying a toast message on the console and the mobile device.

4. The method according to claim 1, wherein the console is prevented from editing a password field.

5. The method according to claim 1, wherein the field for entry of the user authentication data is greyed out on the console.

6. The method according to claim 1, wherein the field for entry of the user authentication data appears as a predefined character on the console.

7. The method according to claim 1, wherein the field for entry of the user authentication data remains hidden regardless of orientation of the mobile device.

8. The method according to claim 3, wherein the toast message will be a predefined message.

9. The method according to claim 1, further comprising:
   hiding a keyboard display at the console on a condition that the user is typing in the field for entry of the user authentication data.

10. The method according to claim 9, further comprising:
    displaying the keyboard display at the console on a condition that the user is typing outside the field for entry of the user authentication data.

11. The method according to claim 1, wherein the remote management session is end user initiated.

12. The method according to claim 1, wherein the remote management session is console initiated.

13. A system for protecting passwords on a mobile device during a remote management session, comprising:
- a mobile device;
- a technician console configured with remote session communication protocol to establish a remote management session with the mobile device; and
- the technician console configured to attempt to access a protected application on the mobile device,
- wherein streaming of the remote management session between the mobile device and the technician console is paused on a condition that a user is typing in a field for entry of user authentication data to access the protected application and streaming is resumed on a condition that the user is typing outside the field for entry of the user authentication data.

14. The system according to claim 13, wherein the user authentication data is a password.

15. The system according to claim 13, further comprising: the console configured to display a toast message.

16. The system according to claim 13, wherein the console is prevented from editing a password field.

17. The system according to claim 13, wherein the field for entry of the user authentication data is greyed out on the console.

18. The system according to claim 13, wherein the field for entry of the user authentication data appears as a predefined character on the console.

19. The system according to claim 13, wherein the field for entry of the user authentication data remains hidden regardless of orientation of the mobile device.

20. The system according to claim 15, wherein the toast message will be a predefined message.

21. The system according to claim 13, wherein a keyboard display is hidden at the console on a condition that the user is typing in a field for entry of the user authentication data.

22. The system according to claim 21, wherein the keyboard display is displayed at the console on a condition that the user is typing outside the field for entry of the user authentication data.

23. The system according to claim 13, wherein the remote management session is end user initiated.

24. The system according to claim 13, wherein the remote management session is console initiated.

* * * * *